United States Patent [19] [11] Patent Number: 4,779,286
Wheatley [45] Date of Patent: Oct. 18, 1988

[54] MULTIPLE-FOLD LASER
[75] Inventor: David I. Wheatley, Dundee, Scotland
[73] Assignee: Ferranti plc, Cheshire, England
[21] Appl. No.: 66,146
[22] Filed: Jun. 25, 1987
[30] Foreign Application Priority Data
Jul. 11, 1986 [GB] United Kingdom ............... 8616997
[51] Int. Cl.[4] ............................................ H01S 3/082
[52] U.S. Cl. ...................................... 372/93; 372/61;
372/65; 372/97; 372/107
[58] Field of Search .................... 372/93, 97, 99, 107,
372/65, 61

[56] References Cited
U.S. PATENT DOCUMENTS
4,602,372 7/1986 Sasaki et al. ......................... 372/61

Primary Examiner—William L. Sikes
Assistant Examiner—Xuan T. Vo
Attorney, Agent, or Firm—Larson & Taylor

[57] ABSTRACT

A laser optical cavity extends between two end reflectors (11, 12) and is defined by at least three sections. A number of folding reflectors (14) are provided for directing radiation emerging from one section into the next. An active medium is contained in the sections and excitation means are provided to produce laser action. A rigid support member (10) supports the end reflectors (11, 12) and the folding reflectors (14) around a generally cylindrical surface such that a continuous optical path extends between the end reflectors (11, 12) by way of each folding reflector (14) in turn. At least three of the laser sections extend across a substantial part of the area with the cylinder (10) and each section crosses at least one other section at or near to the axis of said cylinder as viewed along that axis.

11 Claims, 2 Drawing Sheets

MULTIPLE-FOLD LASER

BACKGROUND OF THE INVENTION

This invention relates to lasers and in particular to such lasers in which the optical cavity is "folded" into a number of sections. One of the factors affecting the output power of a laser is the length of the optical path passing through an excited active medium. Hence the length of the optical path is dependent upon the required output power. The physical dimensions of the laser will be determined by other considerations, however, and it is common to "fold" the optical path of a laser to reduce its actual length. Folding is achieved by using prisms or mirrors at the end of each laser section, and it is necessary to ensure that the correct alignments of these reflectors are maintained. This is a serious problem which increases as the number of folds increases.

SUMMARY OF THE INVENTION

It is an object of the invention to provide a multiple-fold laser having a simple and robust construction.

According to the present invention there is provided a multiple-fold laser comprising an optical cavity extending between two end reflectors, at least two intermediate folding reflectors arranged together with the two end reflectors around a generally cylindrical surface such that a continuous optical path between the two end reflectors is provided by way of sucessive reflections from each folding reflector, in turn, in a predetermined sequence, each part of the optical path between a pair of reflectors defining a section of the laser, an active medium filling at least some of said sections, excitation means for producing laser action in the active medium contained in at least some of said sections, and support means for supporting said end reflectors and said folding reflectors such that at least three sections of the laser extend across the area within the cylindrical surface and such that the optical path through each such section crosses the optical path through at least one other such section at least near to the longitudinal axis of the cylindrical surface.

The term "generally cylindrical surface" is used to define the general form of the support member. This may range from a simple ring to a cylinder of considerable height. The generally cylindrical surface may be made up from a number of straight sections forming a multi-sided figure rather than a circular cylinder.

BRIEF DESCRIPTION OF THE DRAWINGS

The invention will now be described with reference to the accompanying drawings, in which.

DESCRIPTION OF THE PREFERRED EMBODIMENTS

Figure 1:
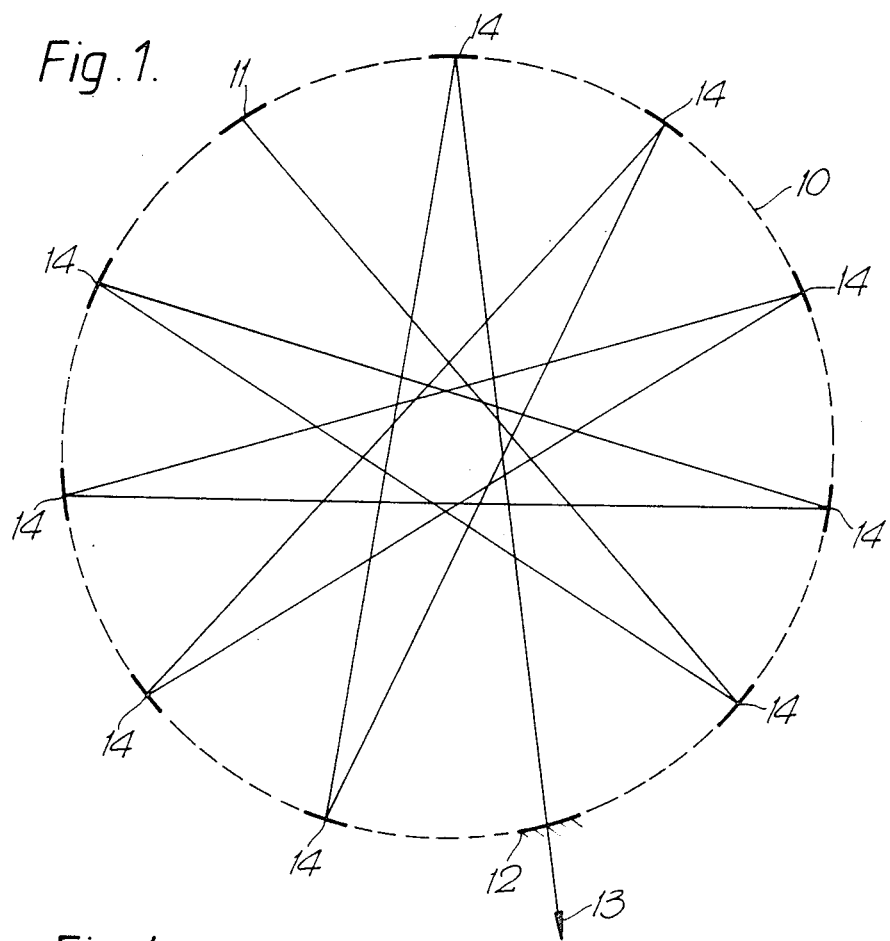
FIG. 1 is a schematic diagram illustrating one possible arrangement of end reflector and folding reflectors.

Referring now to FIG. 1 this shows only the reflectors and optical path of a multi-fold gas laser according to the invention.

A support member of circular form, shown by the broken line 10, carries a number of equally-spaced reflectors each having its reflecting surface directed inwardly. More particularly one reflector 11 is 100% relfecting and forms one end reflector of the laser optical cavity, whilst another reflector 12 is partially transmitting and forms the other end reflector of the cavity and thus provide an output beam 13. In the embodiment illustrated a further nine folding reflectors 14 are provided, the eleven reflectors being equally spaced around the support member 10. The drawing shows how the optical path is arranged, as shown, each section of the path between a pair of reflectors (e.g., between reflector 11 and opposed reflector 14) extends across a substantial part of the area within the support member 10 as shown, for example, by the line between reflector 11 and the opposite reflector 14.

An arrangement such as that shown in FIG. 1 provides the possibility of a simple, robust support for all the reflectors which should maintain the correct alignment between reflectors when subjected to thermal or mechanical stress, a very important consideration with a multi-fold laser. A further advantage is that any required number of sections greater than two many be used simply by omitting the other reflectors and positioning the end reflector appropriately. This allows a standard construction to be used for a range of lasers with different output power.

Figure 2:
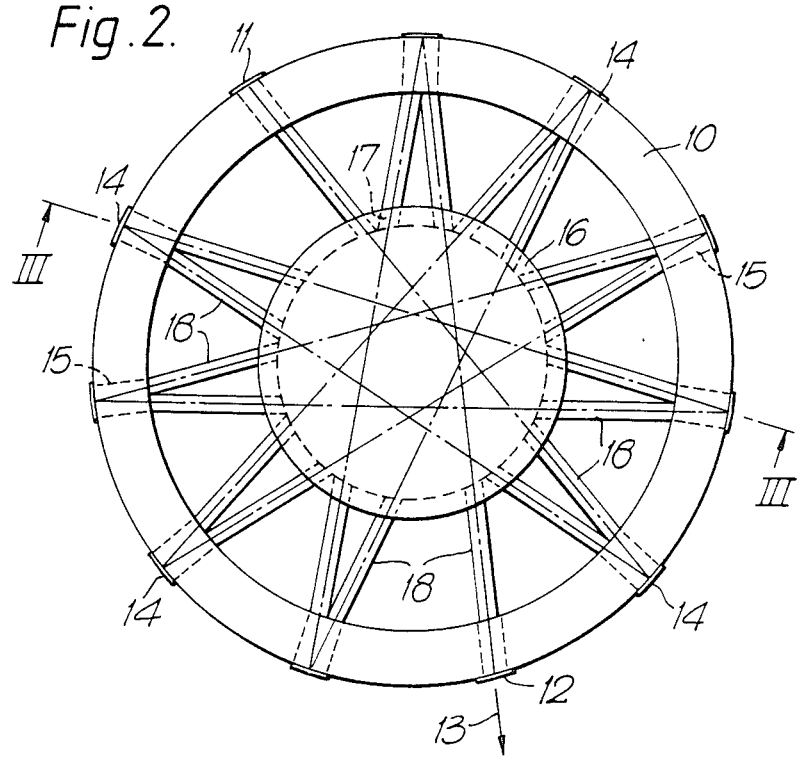
FIG. 2 is a plan view of a first embodiment of a laser incorporating the arrangement of FIG. 1.
Figure 3:
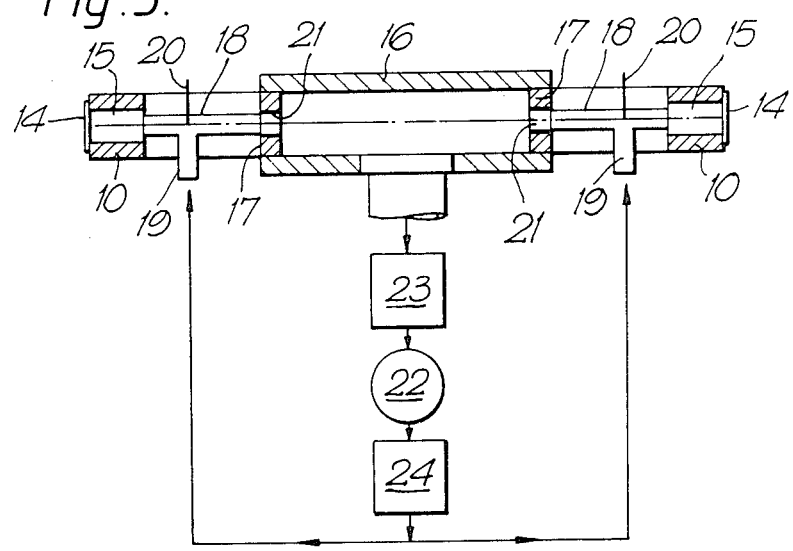
FIG. 3 is a part-schematic sectional view of the laser of FIG. 2 along the line III—III.

FIGS. 2 and 3 illustrate a practical form of laser using the principle of FIG. 1. FIG. 2 is a plan view of a laser having the same number of sections as are shown in FIG. 1. The support member 10 comprises a metal ring having radial apertures 15 formed in it in positions where mirrors are required. The mirrors 11, 12 and 14 are secured to the outer edge of the ring 10.

Located in the centre of the ring 10 is a cylindrical hollow manifold 16. Each section of the laser extending between two mirrors on opposite sides of the ring 10 passes through the manifold 16 and apertures 17 are formed in the wall of the manifold 16 accordingly. Two separate excitation regions in the form of discharge tubes 18 are arranged on each laser section between the support ring 10 and the manifold 16 as shown schematically in FIG. 2. Thus the laser shown in FIG. 2 has ten sections and a total of twenty excitation discharge tubes.

FIG. 3 is a sectional view along the line III—III of FIG. 2 and shows in greater detail the arrangement of a pair of discharge tubes. As shown in FIG. 3 each discharge tube 18 extends between the outer support ring 10 and the central manifold 16. Each discharge tube is provided with a gas inlet port 19 through which the gaseous active medium may enter each discharge tube. The gas then flows along the tube to the central manifold 16. In order to provide the necessary excitation discharge each discharge tube is provided with an anode electrode 20 projecting into the discharge tube and a cathode 21.

A gas circulation system is provided which is also illustrated schematically in FIG. 3. A pump 22 extracts the gas from the central manifold 16 by way of a heat exchanger 23 which removes the heat resulting from the electrical discharges. A further heat exchanger 24 may follow the pump 22 from which gas is then returned to the discharge tubes through the gas inlet ports 19.

One of the main benefits arising from the invention is the provision of a simple construction which provides a rigid support for all the reflectors of the laser.

It will be understood that the above description refers to one particular embodiment of the invention and that many of the features may be modified. As already suggested a smaller number of sections of the laser may be used to produce a lower output power. This may be done by actually omitting some of the discharge tubes 18 and mirrors 14 and hence providing a laser with a smaller number of folds. Alternatively all sections may be provided but some of them need not be excited by an electrical discharge, thus reducing the laser gain and hence the output power. This in fact provides a simple method of controlling the output power.

In place of the separate cathode electrodes 21 provided for each discharge tube the central manifold may, if made of electrically-conducting material, be used as a common electrode.

Although the laser described above uses a continuous flow of gas the system may be sealed if only low power outputs are required. The gas circulation system, if used, may be different from the general arrangement shown in FIG. 3. For example, gas may be fed to the discharge tubes through the support ring 10 if this is hollow.

Figure 4:
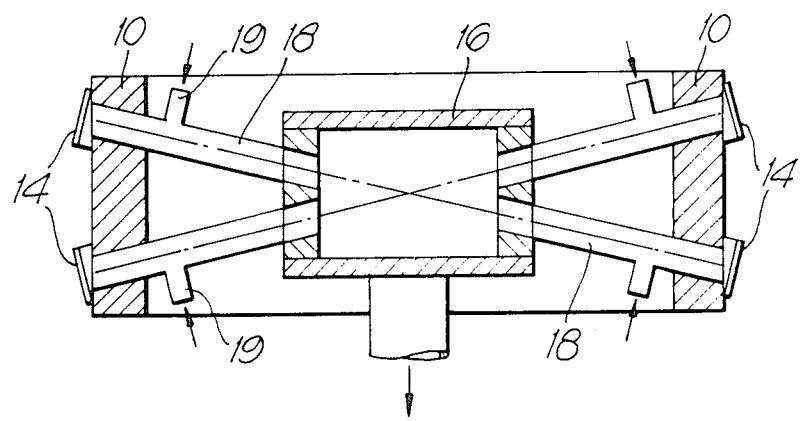
FIG. 4 is a part-sectional view of a second embodiment.

Clearly the construction shown in FIGS. 2 and 3 presents limitations in the number of sections which may be used. This is because of the need to provide separate apertures in the central manifold for each discharge tube. It is possible, however, to extend the arrangement of discharge tubes out of a single plane for example, by arranging alternate ones of the mirrors carried by the support ring 10 at two different levels. FIG. 4 shows a simplified sectional view of part of such an arrangement and shows upper and lower rows of mirrors 14 arranged round the support ring 10. The sections of the laser are now inclined to the plane which they occupied in the previous embodiment. In this way double the number of sections may be provided.

In the embodiments described the support member 10 has been circular in form. Whilst this is the simplest and most convenient shape, the support member could take some other near-circular shape. For example if a total of seven mirrors was used then the support member could be heptagonal. It is not even essential that each section of the laser should be of the same length. though this would be convenient for ease of manufacture.

The various mirrors may be curved or plane or even roof-top arrangements. If single spherically curved mirrors are used then the fold angle between two adjacent sections of the optical path should be kept small, say below 20°.

The laser active medium need not be a gas or gas mixture, though the principle of the folded laser is most commonly used with high power gas lasers.

What we claim is:

1. A multiple-fold laser comprising an optical cavity extending between two end reflectors, at least two intermediate folding reflectors arranged together with the two end reflectors around a generally cylindrical surface such that a continuous optical path between the two end reflectors is provided by way of successive reflections from each folding reflector, in turn, in a predetermined sequence, each part of the optical path between a pair of reflectors defining a section of the laser, an active medium filling at least some of said sections, excitation means for producing laser action in the active medium contained in at least some of said sections, and support means for supporting said end reflectors and said folding reflectors such that at least three sections of the laser extend across the area within the cylindricl surface and such that the optical path through each such section crosses the optical path through at least one other such section at least near to the longitudinal axis of the cylindrical surface.

2. A laser as claimed in claim 1 in which the active medium comprises a gaseous medium.

3. A laser as claimed in claim 2 in which each section of said laser provided with excitation means comprises two separate excitation sections.

4. A laser as claimed in claim 3 in which each excitation section is provided with an anode electrode and a cathode electrode.

5. A laser as claimed in claim 2 in which the gaseous active medium flows through each of said sections, the laser including pump means for producing the gas flow and a heat exchanger for removing heat resulting from the laser action.

6. A laser as claimed in claim 5 in which each excitation section is connected to a central manifold through which the gaseous active medium flows to the pump means and the heat exchanger means.

7. A laser as claimed in claim 6 in which the central manifold forms a common electrode of the excitation means.

8. A laser as claimed in claim 7 in which the support member comprises a hollow tube through which gas flows into each excitation section.

9. A laser as claimed in claim 6 in which the support member comprises a hollow tube through which gas flows into each excitation section.

10. A laser as claimed in claim 1 in which the points at which the optical path through each section of the laser intersects each of the end reflectors and the folding reflectors are located in a single plane.

11. A laser as claimed in claim 1 in which the points at which the optical path through each section of the laser intersects each of the end reflectors and the folding reflectors are located in two parallel planes.

* * * * *